United States Patent
Watanabe et al.

(10) Patent No.: US 9,657,141 B2
(45) Date of Patent: May 23, 2017

(54) POLYARYLENE SULFIDE RESIN, MANUFACTURING METHOD THEREFOR, AND MOLDING

(71) Applicants: DIC Corporation, Tokyo (JP); National University Corporation, Iwate University, Morioka-shi (JP)

(72) Inventors: Hajime Watanabe, Ichihara (JP); Takashi Furusawa, Ichihara (JP); Satoshi Ogawa, Morioka (JP); Toshikazu Takata, Tokyo (JP)

(73) Assignees: DIC Corporation, Tokyo (JP); National University Corporation, Iwate University, Morioka-shi (JP)

( * ) Notice: Subject to any disclaimer, the term of this patent is extended or adjusted under 35 U.S.C. 154(b) by 0 days.

(21) Appl. No.: 14/916,008

(22) PCT Filed: Sep. 2, 2014

(86) PCT No.: PCT/JP2014/073090
§ 371 (c)(1),
(2) Date: Mar. 2, 2016

(87) PCT Pub. No.: WO2015/033938
PCT Pub. Date: Mar. 12, 2015

(65) Prior Publication Data
US 2016/0194450 A1 Jul. 7, 2016

(30) Foreign Application Priority Data
Sep. 3, 2013 (JP) .................................. 2013-182604

(51) Int. Cl.
C08G 75/00 (2006.01)
C08G 75/029 (2016.01)
C08G 75/02 (2016.01)

(52) U.S. Cl.
CPC ........... C08G 75/029 (2013.01); C08G 75/02 (2013.01)

(58) Field of Classification Search
CPC .... C07F 7/0801; C07F 7/0832; C07F 7/0827; C08G 75/00; C07B 51/00; C07D 209/12
See application file for complete search history.

(56) References Cited

U.S. PATENT DOCUMENTS

| | | | |
|---|---|---|---|
| 2,513,188 A | 6/1950 | Macallum | |
| 2,583,941 A | 1/1952 | Gordon, Jr. | |

FOREIGN PATENT DOCUMENTS

| | | | | |
|---|---|---|---|---|
| CN | 1177605 A | 4/1998 | | |
| CN | 1222535 A | 7/1999 | | |
| JP | 05-178993 A | 7/1993 | | |
| JP | 05178993 | * | 7/1993 | ............ C08G 75/02 |
| JP | 09-048853 A | 2/1997 | | |
| JP | 10-182823 A | 7/1998 | | |
| JP | 2001-247675 A | 9/2001 | | |

OTHER PUBLICATIONS

Satoshi Ogawa et al., "Development of Novel Synthesis of Poly(phenylene sulfide)", Abstracts of the 36th Symposium on Main Group Element Chemistry, 2009, pp. 225-226 and English translation thereof.
Satoshi Ogawa et al., "Development of Novel Synthesis of Poly(phenylene sulfide)", Abstracts of the 37th Symposium on Main Group Element Chemistry, 2010, pp. 301-302 and English translation thereof.
Satoshi Ogawa et al., "Development of Novel Synthesis of Poly(phenylene sulfide) 1", 90th Annual Meeting of the Chemical Society of Japan in Spring (2010) Koen Yokoshu IV, 2010, p. 1532, information sheets and English translation thereof.

(Continued)

*Primary Examiner* — Shane Fang
(74) *Attorney, Agent, or Firm* — Locke Lord LLP

(57) ABSTRACT

The present invention relates to a method for manufacturing a polyarylene sulfide resin comprising: a step of reacting a poly(arylenesulfonium salt) having a constitutional unit represented by the following formula (1) with an aliphatic amide compound to obtain a polyarylene sulfide resin having a constitutional unit represented by the following formula (2):

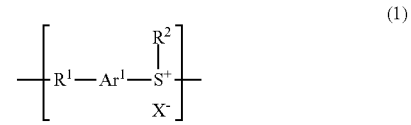

wherein $R^1$ represents a direct bond, $-Ar^2-$, $-Ar^2-S-$ or $-Ar^2-O-$; $Ar^1$ and $Ar^2$ each represent an arylene group optionally having a functional group as a substituent; $R^2$ represents an alkyl group having 1 to 10 carbon atoms or an aromatic group optionally having an alkyl group having 1 to 10 carbon atoms as a substituent; and $X^-$ represents an anion,

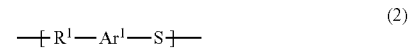

wherein $R^1$ and $Ar^1$ are the same as described above.

2 Claims, No Drawings

(56) References Cited

OTHER PUBLICATIONS

Satoshi Ogawa et al., "Development of Novel Synthesis of Poly(phenylene sulfide)", 91st Annual Meeting of the Chemical Society of Japan in Spring (2011) Koen Yokoshu W, 2011, p. 1320, information sheets and English translation thereof.
Satoshi Ogawa et al., "Synthesis and Properties of Poly(p-phenylene sulfide) Derivatives via Poly(sulfonium salt) by Copolymerization of Two Monomer Species", 94th Annual Meeting of the Chemical Society of Japan in Spring (2014) Koen Yokoshu IV, Mar. 12, 2014, p. 1312, information sheets and English translation thereof.
International Preliminary Report on Patentability and Witten Opinion dated Mar. 8, 2016, issued for PCT/JP2014/073090.
International Search Report mailed Nov. 11, 2014, issued for PCT/JP2014/073090.
Office Action dated Nov. 16, 2016, issued for the Chinese patent application No. 201480048467.1.
Kenichi Oyaizu et al., "Convenient Syntheses of Methylsulfonioarylene and Thioarylene Polymers from 1,4-bis(Methylsulfinyl)benzene," Journal of Macromolecular Science, Part A Pure and Applied Chemistry, vol. 40, No. 4, Jan. 4, 2003, pp. 415-423 and a cover page. (cited in the Mar. 28, 2017 EP Search Report).
Supplementary European Search Report mailed Mar. 28, 2017, issued for the European patent application No. 14841865.0.

\* cited by examiner

POLYARYLENE SULFIDE RESIN, MANUFACTURING METHOD THEREFOR, AND MOLDING

TECHNICAL FIELD

The present invention relates to a polyarylene sulfide resin, a manufacturing method therefor, and a molding, in particular, a polyarylene sulfide resin obtained via a poly (arylenesulfonium salt), a manufacturing method therefor, and a molding.

BACKGROUND ART

Polyarylene sulfide resins (hereinafter sometimes abbreviated as "PAS resin"), the representative of which is a polyphenylene sulfide resin (hereinafter sometimes abbreviated as "PPS resin"), are excellent in heat resistance, chemical resistance and the like and widely utilized for applications such as electric/electronic parts, automotive parts, water heater parts, fibers and films.

A polyphenylene sulfide resin is conventionally manufactured by solution polymerization in which p-dichlorobenzene, and sodium sulfide, or sodium hydrosulfide and sodium hydroxide are used as raw materials to polymerize in an organic polar solvent (e.g., see Patent Literatures 1, 2). Polyphenylene sulfide resins which are currently commercially available are generally produced by this method. However, since dichlorobenzene is used as a monomer in the method, the concentration of halogen remaining in the resin after synthesis tends to be high. In addition, it is necessary to perform polymerization reaction under a severe environment of high temperature and high pressure/strong alkaline, which requires to use a polymerization vessel using titanium, chromium or zirconium, which is expensive and hard-to-process.

Accordingly, as a method for manufacturing a polyarylene sulfide resin without using dichlorobenzene as a polymerizing monomer and under moderate polymerization conditions is known a method in which a poly(arylenesulfonium salt) is utilized as the precursor. In the method, a solvent-soluble poly(arylenesulfonium salt) is manufactured at room temperature under acidic conditions and the obtained poly(arylenesulfonium salt) is dealkylated with a nucleophilic reagent or reductant (e.g., see Patent Literature 3).

CITATION LIST

Patent Literature

Patent Literature 1: U.S. Pat. No. 2,513,188
Patent Literature 2: U.S. Pat. No. 2,583,941
Patent Literature 3: Japanese Unexamined Patent Publication No. H5-178993

SUMMARY OF INVENTION

Technical Problem

Although the above method for manufacturing a polyarylene sulfide resin via a poly(arylenesulfonium salt) is excellent in terms of enabling to obtain a polyarylene sulfide resin having a relatively high molecular weight, it has a problem in that pyridine and quinoline, each of which is a nucleophilic reagent used for a dealkylating agent or dearylating agent, remain in the resin. Therefore, this may contribute to the generation of gas, for example, in processing a resin, which causes the degradation of the quality of a polyarylene sulfide resin molding, the deterioration of the working environment and the degradation of the maintainability of a metal mold.

Accordingly, it is the object of the present invention to sufficiently reduce the amount of a dealkylating agent or dearylating agent remaining in a resin in a method for manufacturing a polyarylene sulfide resin having a sulfide group obtained via a poly(arylenesulfonium salt).

Solution to Problem

The present invention relates to a method for manufacturing a polyarylene sulfide resin comprising: reacting a poly(arylenesulfonium salt) having a constitutional unit represented by the following formula (1) with an aliphatic amide compound to obtain a polyarylene sulfide resin having a constitutional unit represented by the following formula (2):

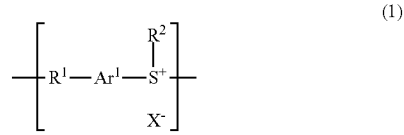

wherein $R^1$ represents a direct bond, $-Ar^2-$, $-Ar^2-S-$ or $-Ar^2-O-$; $Ar^1$ and $Ar^2$ each represent an arylene group optionally having a functional group as a substituent; $R^2$ represents an alkyl group having 1 to 10 carbon atoms or an aryl group optionally having the alkyl group as a substituent; and X represents an anion,

wherein $R^1$ represents a direct bond, $-Ar^2-$, $-Ar^2-S-$ or $-Ar^2-O-$; and $Ar^1$ and $Ar^2$ each represent an arylene group optionally having a functional group as a substituent.

Advantageous Effects of Invention

The present invention can sufficiently reduce the amount of a dealkylating agent or dearylating agent remaining in a resin in a method for manufacturing a polyarylene sulfide resin having a sulfide group via a poly(arylenesulfonium salt).

DESCRIPTION OF EMBODIMENTS

Hereinafter, suitable embodiments of the present invention will be described in detail. However, the present invention is never limited to the following embodiments.

The method for manufacturing a polyarylene sulfide resin according to the present embodiment includes: reacting a poly(arylenesulfonium salt) with an aliphatic amide compound to obtain a polyarylene sulfide resin.

The aliphatic amide compound used in the present embodiment is a compound represented by the following formula (10), for example.

In formula (10), $R^{11}$, $R^{12}$ and $R^{13}$ each independently represent a hydrogen atom or an alkyl group having 1 to 10 carbon atoms; and $R^{11}$ and $R^{13}$ may be bonded together to form a cyclic structure. Examples of the alkyl group having 1 to 10 carbon atoms include a methyl group, an ethyl group, a propyl group, a butyl group, a pentyl group, a hexyl group, a heptyl group, an octyl group, a nonyl group and a decyl group.

It is believed that the compound represented by formula (10) functions as a so-called dealkylating agent or dearylating agent as illustrated in the following reaction formula, for example. That is, the compound can function to dealkylate or dearylate an alkyl group or aryl group bonding to the sulfur atom of a sulfonium salt for sulfidation.

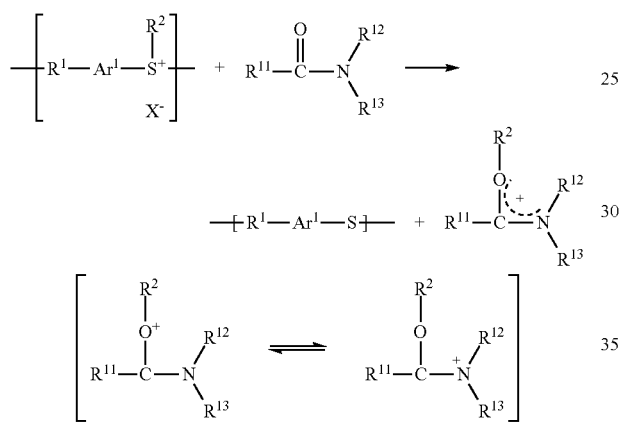

Aliphatic amide compounds have a higher water miscibility than those of aromatic amide compounds and a low compatibility with a polyarylene sulfide resin, and hence can be easily removed by washing the reaction mixture with water. Due to this, the amount of a dealkylating agent or dearylating agent remaining in a polyarylene sulfide resin can be reduced. As a result, the generation of gas can be suppressed, for example, in processing a resin, the quality of a polyarylene sulfide resin molding can be enhanced and the working environment can be improved, and in addition the maintainability of a metal mold can be enhanced. Further, because an aliphatic amide compound is also excellent in solubility for organic compounds having a relatively small molecular weight, use of the aliphatic amide compound enables to easily remove an oligomer component of a polyarylene sulfide from the reaction mixture. As a result, the oligomer component, which may contribute to the generation of gas, can be removed by the aliphatic amide compound to synergistically enhance the quality of a polyarylene sulfide resin to be obtained.

Examples of the aliphatic amide compound which can be used include the compounds represented by the above formula (10) such as primary amide compounds such as formamide; secondary amide compounds such as β-lactam; and tertiary amide compounds such as N-methyl-2-pyrrolidone, 2-pyrrolidone, ε-caprolactam, N-methyl-ε-caprolactam, dimethylformamide, diethylformamide and dimethylacetamide; and additionally urea compounds such as tetramethylurea and 1,3-dimethyl-2-imidazolidinone. From the view point of the solubility for a poly(arylenesulfonium salt) and the solubility in water, the aliphatic amide compound preferably includes an aliphatic tertiary amide compound in which $R^{12}$ and $R^{13}$ are each an aliphatic group, and especially, N-methyl-2-pyrrolidone is particularly preferable.

The aliphatic amide compound not only functions as a dealkylating agent or dearylating agent, but also can be used as a reaction solvent because of being excellent in solubility for a poly(arylenesulfonium salt). Although the amount of the aliphatic amide compound to be used is not particularly limited, the lower limit is preferably in a range of 1.00 equivalent or more, more preferably in a range of 1.02 equivalents or more, and still more preferably in a range of 1.05 equivalents or more based on the total amount of a poly(arylenesulfonium salt). In the case that the amount of the aliphatic amide compound to be used is 1.00 equivalent or more, dealkylation or dearylation of a poly(arylenesulfonium salt) can be carried out satisfactorily. On the other hand, the upper limit is preferably 100 equivalents or less, and more preferably 10 equivalents or less. As the reaction solvent, the aliphatic amide compound may be used alone or in combination with another solvent such as toluene.

The poly(arylenesulfonium salt) used in the present embodiment has a constitutional unit represented by the following formula (1).

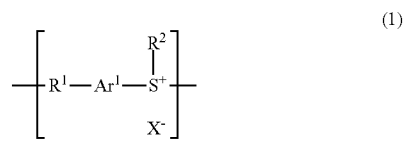

In formula (1), $R^1$ represents a direct bond, $-Ar^2-$, $-Ar^2-S-$ or $-Ar^2-O-$; $Ar^1$ and $Ar^2$ each represent an arylene group optionally having a functional group as a substituent; $R^2$ represents an alkyl group having 1 to 10 carbon atoms or an aryl group optionally having an alkyl group having 1 to 10 carbon atoms as a substituent; and $X^-$ represents an anion.

Here, examples of $X^-$ include anions such as sulfonate, carboxylate and a halogen ion. $Ar^1$ and $Ar^2$ may be, for example, an arylene group such as phenylene, naphthylene and biphenylene. Although $Ar^1$ and $Ar^2$ can be the same or different, they are preferably the same.

The mode of bonding in $Ar^1$ and $Ar^2$ is not particularly limited, but it is preferably a situation in which bonds are present at positions distant from each other in the arylene group. For example, in the case that $Ar^1$ and $Ar^2$ are each a phenylene group, a unit bonding at the p-position and a unit bonding at the m-position are preferable, and a unit bonding at the p-position is more preferably. Being composed of a unit bonding at the p-position is preferable in the aspect of the heat resistance and crystalline character of a resin.

When the arylene group represented by $Ar^1$ or $Ar^2$ has a functional group as a substituent, the functional group is preferably a hydroxy group, an amino group, a mercapto group, a carboxy group or a sulfo group. However, the fraction of the constitutional unit of formula (1) in which $Ar^1$ or $Ar^2$ is an arylene group having a substituent is preferably in a range of 10% by mass or less, and more preferably 5% by mass or less based on the whole poly(arylenesulfonium salt) from the viewpoint of suppressing the reduction of the crystallinity and heat resistance of a polyarylene sulfide resin.

Examples of $R^2$ include alkyl groups having 1 to 10 carbon atoms such as a methyl group, an ethyl group, a propyl group, a butyl group, a pentyl group, a hexyl group, a heptyl group, an octyl group, a nonyl group and a decyl group; and aryl groups having a structure of phenyl, naphthyl, biphenyl or the like. Further, the aryl group may have 1 to 4 substituents of an alkyl group having 1 to 10 carbon atoms such as a methyl group, an ethyl group, a propyl group, a butyl group, a pentyl group, a hexyl group, a heptyl group, an octyl group, a nonyl group and a decyl group on the aromatic ring.

A poly(arylenesulfonium salt) having the constitutional unit represented by formula (1) can be obtained, for example, by using a method in which an aromatic sulfoxide is polymerized in the presence of an acid.

The aromatic sulfoxide includes compounds represented by the following formula (20), for example. Although the positions of substitution of the two substituents are not particularly limited, it is preferable that the two positions of substitution be as distant as possible from each other in the molecule. The preferable position of substitution is p-position.

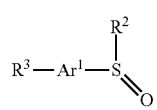
(20)

In formula (20), $R^2$ and $Ar^1$ have the same definitions as those in formula (1); $R^3$ represents a hydrogen atom, $Ar^3$—, $Ar^3$—S— or $Ar^3$—O—; and $Ar^3$ represents an aryl group optionally having a functional group as a substituent.

Here, examples of $Ar^3$ include aryl groups having a structure of phenyl, naphthyl, biphenyl or the like, and the aryl group may have at least one functional group selected from a hydroxy group, an amino group, a mercapto group, a carboxy group and a sulfo group as a substituent.

Examples of the compound represented by formula (20) which can be used include methylphenyl sulfoxide and methyl-4-(phenylthio)phenyl sulfoxide. Among these compounds, methyl-4-(phenylthio)phenyl sulfoxide is preferable. One of the aromatic sulfoxides may be used singly, or two or more thereof may be used in combination.

As the acid to be used in synthesizing a poly(arylenesulfonium salt), both an organic acid and an inorganic acid can be used. As the acid, both an organic acid and an inorganic acid can be used.

Examples of the acid include non-oxoacids such as hydrochloric acid, hydrobromic acid, hydrocyanic acid and tetrafluoroboric acid; inorganic oxoacids such as sulfuric acid, phosphoric acid, perchloric acid, bromic acid, nitric acid, carbonic acid, boric acid, molybdic acid, isopoly acid and heteropoly acid; partial salts or partial esters of sulfuric acid such as sodium hydrogen sulfate, sodium dihydrogen phosphate, proton-remaining heteropoly acid salts, monomethyl sulfate and trifluoromethane sulfate; mono- or polycarboxylic acids such as formic acid, acetic acid, propionic acid, butanoic acid, succinic acid, benzoic acid and phthalic acid; halogen-substituted carboxylic acids such as monochloroacetic acid, dichloroacetic acid, trichloroacetic acid, monofluoroacetic acid, difluoroacetic acid and trifluoroacetic acid; mono- or polysulfonic acids such as methanesulfonic acid, ethanesulfonic acid, propanesulfonic acid, benzenesulfonic acid, toluenesulfonic acid, trifluoromethanesulfonic acid and benzenedisulfonic acid; partial metal salts of a polysulfonic acid such as sodium benzenedisulfonate; and Lewis acids such as antimony pentachloride, aluminum chloride, aluminum bromide, titanium tetrachloride, tin tetrachloride, zinc chloride, copper chloride and iron chloride. Among these acids, it is preferable to use trifluoromethanesulfonic acid or methanesulfonic acid from the viewpoint of reactivity. These acids may be used singly or in combinations of two or more thereof.

In addition, a dehydrating agent may be used in combination because this reaction is a dehydration reaction. Examples of the dehydrating agent include phosphoanhydrides such as phosphorous oxide and phosphorous pentoxide; sulfonic anhydrides such as benzenesulfonic anhydride, methanesulfonic anhydride, trifluoromethanesulfonic anhydride and p-toluenesulfonic anhydride; carboxylic anhydrides such as acetic anhydride, fluoroacetic anhydride and trifluoroacetic anhydride; anhydrous magnesium sulfate, zeolite, silica gel and calcium chloride. These dehydrating agents may be used singly or in combinations of two or more thereof.

A solvent can be appropriately used in synthesizing a poly(arylenesulfonium salt). Examples of the solvent include alcohol solvents such as methanol, ethanol, propanol and isopropyl alcohol; ketone solvents such as acetone, methyl ethyl ketone and methyl isobutyl ketone; nitrile solvents such as acetonitrile; halogen-containing solvents such as methylene chloride and chloroform; saturated hydrocarbon solvents such as n-hexane, cyclohexane, n-heptane and cycloheptane; amide solvents such as dimethylacetamide and N-methyl-2-pyrrolidone; sulfur-containing solvents such as sulfolane and DMSO; and ether solvents such as tetrahydrofuran and dioxane. These solvents may be used singly or in combinations of two or more thereof.

Conditions for the reaction of the poly(arylenesulfonium salt) according to the present embodiment with the aliphatic amide compound can be appropriately adjusted so as to allow dealkylation or dearylation to proceed suitably. The reaction temperature is preferably in a range of 40 to 250° C., and more preferably in a range of 70 to 220° C.

By using the manufacturing method according to the present embodiment, it is possible to reduce the amount of a dealkylating agent or dearylating agent remaining in a polyarylene sulfide resin to be obtained. The amount of a dealkylating agent or dearylating agent remaining in the resin is preferably in a range of 1000 ppm or less, more preferably in a range of 700 ppm or less, and still more preferably in a range of 100 ppm or less based on the mass of the resin including a polyarylene sulfide resin and other components such as a dealkylating agent or dearylating agent. In the case of 1000 ppm or less, it is possible to reduce a substantial influence on the quality of a polyarylene sulfide resin to be obtained. A polyarylene sulfide resin obtained by the manufacturing method according to the present embodiment can be distinguished from a polyarylene sulfide resin manufactured by another method on the basis of the types and contents of mixed components such as a dealkylating agent or dearylating agent.

The method for manufacturing a polyarylene sulfide resin according to the present embodiment may further include washing a polyarylene sulfide resin with water, a water-soluble solvent or a mixture solvent thereof. By including such a washing step, it is possible to reliably reduce the amount of a remaining dealkylating agent or dearylating agent contained in a polyarylene sulfide resin to be obtained.

The solvent used in the washing step is, although not particularly limited, preferably one which dissolves an unreacted material therein. Examples of the solvent include water; acidic aqueous solutions such as an aqueous solution of hydrochloric acid, an aqueous solution of acetic acid, an aqueous solution of oxalic acid and an aqueous solution of nitric acid; aromatic hydrocarbon solvents such as toluene and xylene; alcohol solvents such as methanol, ethanol, propanol and isopropyl alcohol; amide solvents such as dimethylacetamide and N-methyl-2-pyrrolidone; saturated hydrocarbon solvents such as n-hexane, cyclohexane, n-heptane and cycloheptane; ketone solvents such as acetone, methyl ethyl ketone and methyl isobutyl ketone; and halogen-containing solvents such as dichloromethane and chloroform. These solvents may be used singly or in combinations of two or more thereof. Among these solvents, water and N-methyl-2-pyrrolidone are preferable from the viewpoint of removal of the reaction reagents and removal of the oligomer component of the resin.

By the manufacturing method according to the present embodiment, it is possible to obtain a polyarylene sulfide resin containing a constitutional unit represented by the following formula (2) and having a sulfide group.

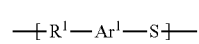  (2)

In formula (2), $R^1$ and $Ar^1$ have the same definitions as those in formula (1).

The glass transition temperature of a polyarylene sulfide resin obtained by the manufacturing method according to the present embodiment is preferably in a range of 70 to 110° C., and more preferably in a range of 80 to 95° C. The glass transition temperature of a resin refers to a value measured with a DSC instrument.

The melting point of the polyarylene sulfide resin obtained by using the manufacturing method according to the present embodiment is preferably in a range of 260 to 300° C., and more preferably 270 to 290° C. The melting point of a resin refers to a value measured with a DSC instrument.

The polyarylene sulfide resin obtained by the manufacturing method according to the present embodiment can be combined with another component for utilizing as a polyarylene sulfide resin composition. For example, an inorganic filler can be used as the other component, and a resin other than the polyarylene sulfide resin selected from a thermoplastic resin, an elastomer and a cross-linkable resin or the like can also be used.

Examples of the inorganic filler include powdered fillers such as carbon black, calcium carbonate, silica and titanium oxide; platy fillers such as talk and mica; granular fillers such as a glass bead, a silica bead and a glass balloon; fibrous fillers such as a glass fiber, a carbon fiber and a wollastonite fiber; and a glass flake. These inorganic fillers can be used singly or in combinations of two or more thereof. By formulating an inorganic filler, a composition having a high stiffness and a high thermal stability can be obtained. The polyarylene sulfide resin composition particularly preferably contains at least one inorganic filler selected from the group consisting of a glass fiber, a carbon fiber, carbon black and calcium carbonate.

The content of an inorganic filler is preferably in a range of 1 to 300 parts by mass, more preferably in a range of 5 to 200 parts by mass, and still more preferably in a range of 15 to 150 parts by mass based on 100 parts by mass of the polyarylene sulfide resin. The content of an inorganic filler being within such a range can result in more excellent effect in terms of retaining the mechanical strength of a molding.

The polyarylene sulfide resin composition may contain a resin other than the polyarylene sulfide resin selected from a thermoplastic resin, an elastomer and a cross-linkable resin. These resins can also be formulated in the resin composition together with an inorganic filler.

Examples of the thermoplastic resin to be formulated in the polyarylene sulfide resin composition include polyester, polyamide, polyimide, polyetherimide, polycarbonate, polyphenylene ether, polysulfone, polyether sulfone, polyether ether ketone, polyether ketone, polyethylene, polypropylene, polytetrafluoroethylene, polydifluoroethylene, polystyrene, ABS resins, silicone resins and liquid crystal polymers (e.g., liquid crystal polyester). These thermoplastic resins can be used singly or in combinations of two or more thereof.

Polyamide is a polymer having an amide bond (—NHCO—). Examples of the polyamide resin include (i) polymers obtained by polycondensation of a diamine and a dicarboxylic acid; (ii) polymers obtained by polycondensation of an aminocarboxylic acid; and (iii) polymers obtained by ring-opening polymerization of a lactam.

Examples of the diamine to obtain polyamide include aliphatic diamines, aromatic diamines and alicyclic diamines. As the aliphatic diamine, linear or branched diamines having 3 to 18 carbon atoms are preferable. Examples of a suitable aliphatic diamine include 1,3-trimethylenediamine, 1,4-tetramethylenediamine, 1,5-pentamethylenediamine, 1,6-hexamethylenediamine, 1,7-heptamethylenediamine, 1,8-octamethylenediamine, 2-methyl-1,8-octanediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,15-pentadecamethylenediamine, 1,16-hexadecamethylenediamine, 1,17-heptadecamethylenediamine, 1,18-octadecamethylenediamine, 2,2,4-trimethylhexamethylenediamine and 2,4,4-trimethylhexamethylenediamine. These can be used singly or in combinations of two or more thereof.

As the aromatic diamine, diamines having a phenylene group and having 6 to 27 carbon atoms are preferable. Examples of a suitable aromatic diamine include o-phenylenediamine, m-phenylenediamine, p-phenylenediamine, m-xylylenediamine, p-xylylenediamine, 3,4-diaminodiphenyl ether, 4,4'-diaminodiphenyl ether, 4,4'-diaminodiphenylmethane, 3,3'-diaminodiphenyl sulfone, 4,4'-diaminodiphenyl sulfone, 4,4'-diaminodiphenyl sulfide, 4,4'-di(m-aminophenoxy)diphenyl sulfone, 4,4'-di(p-aminophenoxy)diphenyl sulfone, benzidine, 3,3'-diaminobenzophenone, 4,4'-diaminobenzophenone, 2,2-bis(4-aminophenyl)propane, 1,5-diaminonaphthalene, 1,8-diaminonaphthalene, 4,4'-bis(4-aminophenoxy)biphenyl, 2,2-bis[4-(4-aminophenoxy)phenyl]hexafluoropropane, 1,4-bis(4-aminophenoxy)benzene, 1,3-bis(4-aminophenoxy)benzene, 1,3-bis(3-aminophenoxy)benzene, 1,3-bis(3-aminophenoxy)benzene, 4,4'-diamino-3,3'-diethyl-5,5'-dimethyldiphenylmethane, 4,4'-diamino-3,3',5,5'-tetramethyldiphenylmethane, 2,4-diaminotoluene, and 2,2'-dimethylbenzidine. These can be used singly or in combinations of two or more thereof.

As the alicyclic diamine, diamines having a cyclohexylene group and having 4 to 15 carbon atoms are preferable. Examples of a suitable alicyclic diamine include 4,4'-diamino-dicyclohexylenemethane, 4,4'-diamino-dicyclohexylenepropane, 4,4'-diamino-3,3'-dimethyl-dicyclohexylenemethane, 1,4-diaminocyclohexane and piperazine. These can be used singly or in combinations of two or more thereof.

Examples of the dicarboxylic acid to obtain polyamide include aliphatic dicarboxylic acids, aromatic dicarboxylic acids and alicyclic dicarboxylic acids.

As the aliphatic dicarboxylic acid, saturated or unsaturated dicarboxylic acids having 2 to 18 carbon atoms are preferable. Examples of a suitable aliphatic dicarboxylic acid include oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, octadecanedioic acid, maleic acid and fumaric acid. These can be used singly or in combinations of two or more thereof.

As the aromatic dicarboxylic acid, dicarboxylic acids having a phenylene group and having 8 to 15 carbon atoms are preferable. Examples of a suitable aromatic dicarboxylic acid include isophthalic acid, terephthalic acid, methylterephthalic acid, biphenyl-2,2'-dicarboxylic acid, biphenyl-4,4'-dicarboxylic acid, diphenylmethane-4,4'-dicarboxylic acid, diphenyl ether-4,4'-dicarboxylic acid, diphenyl sulfone-4,4'-dicarboxylic acid, 2,6-naphthalenedicarboxylic acid, 2,7-naphthalenedicarboxylic acid and 1,4-naphthalenedicarboxylic acid. These can be used singly or in combinations of two or more thereof. In addition, polycarboxylic acids such as trimellitic acid, trimesic acid and pyromellitic acid can also be used within a range in which melt molding can be performed.

As the aminocarboxylic acid, aminocarboxylic acids having 4 to 18 carbon atoms are preferable. Examples of a suitable aminocarboxylic acid include 4-aminobutyric acid, 6-aminohexanoic acid, 7-aminoheptanoic acid, 8-aminooctanoic acid, 9-aminononanoic acid, 10-aminodecanoic acid, 11-aminoundecanoic acid, 12-aminododecanoic acid, 14-aminotetradecanoic acid, 16-aminohexadecanoic acid and 18-aminooctadecanoic acid. These can be used singly or in combinations of two or more thereof.

Examples of the lactam to obtain polyamide include ε-caprolactam, ω-laurolactam, ζ-enantholactam and η-capryllactam. These can be used singly or in combinations of two or more thereof.

Examples of a preferable combination of the raw materials for polyamide include s-caprolactam (nylon 6), 1,6-hexamethylenediamine/adipic acid (nylon 6,6), 1,4-tetramethylenediamine/adipic acid (nylon 4,6), 1,6-hexamethylenediamine/terephthalic acid, 1,6-hexamethylenediamine/terephthalic acid/ε-caprolactam, 1,6-hexamethylenediamine/terephthalic acid/adipic acid, 1,9-nonamethylenediamine/terephthalic acid, 1,9-nonamethylenediamine/terephthalic acid/s-caprolactam, 1,9-nonamethylenediamine/1,6-hexamethylenediamine/terephthalic acid/adipic acid and m-xylylenediamine/adipic acid. Among them, further preferable is a polyamide resin obtained from 1,4-tetramethylenediamine/adipic acid (nylon 4,6), 1,6-hexamethylenediamine/terephthalic acid/ε-caprolactam, 1,6-hexamethylenediamine/terephthalic acid/adipic acid, 1,9-nonamethylenediamine/terephthalic acid, 1,9-nonamethylenediamine/terephthalic acid/s-caprolactam or 1,9-nonamethylenediamine/1,6-hexamethylenediamine/terephthalic acid/adipic acid.

The content of the thermoplastic resin is preferably in a range of 1 to 300 parts by mass, more preferably in a range of 3 to 100 parts by mass and still more preferably in a range of 5 to 45 parts by mass based on 100 parts by mass of the polyarylene sulfide resin. Due to the content of the thermoplastic resin other than the polyarylene sulfide resin being within such a range, an effect of the further enhancement of heat resistance, chemical resistance and mechanical properties can be obtained.

As the elastomer to be formulated in the polyarylene sulfide resin composition, a thermoplastic elastomer is often used. Examples of the thermoplastic elastomer include polyolefin elastomers, fluorine-based elastomers and silicone elastomers. Note that, in the present specification, thermoplastic elastomers are classified into not the thermoplastic resin, but an elastomer.

In the case that the polyarylene sulfide resin has a functional group such as a carboxyl group, the elastomer (in particular, the thermoplastic elastomer) preferably has a functional group which can react with the functional group of the polyarylene sulfide resin. This enables to obtain a resin composition particularly excellent in adhesion properties, impact resistance and the like. Examples of the functional group include an epoxy group, an amino group, a hydroxyl group, a carboxy group, a mercapto group, an isocyanate group, an oxazoline group and a group represented by the formula: $R^4(CO)O(CO)$— or $R^4(CO)O$— (wherein $R^4$ represents an alkyl group having 1 to 8 carbon atoms). A thermoplastic elastomer having the functional group can be obtained, for example, by copolymerization of an α-olefin and a vinyl-polymerizable compound having the functional group.

Examples of the α-olefin include α-olefins having 2 to 8 carbon atoms such as ethylene, propylene and butene-1. Examples of the vinyl-polymerizable compound having the functional group include α,β-unsaturated carboxylic acids and alkyl esters thereof such as (meth)acrylic acid and (meth)acrylate; maleic acid, fumaric acid, itaconic acid and other α,β-unsaturated dicarboxylic acids having 4 to 10 carbon atoms and derivatives (mono- or diesters and acid anhydrides thereof) thereof; and glycidyl (meth)acrylate. Among them, ethylene-propylene copolymers and ethylene-butene copolymers having at least one functional group selected from the group consisting of an epoxy group, a carboxy group and a group represented by the formula: $R^4(CO)O(CO)$— or $R^4(CO)O$— (wherein $R^4$ represents an alkyl group having 1 to 8 carbon atoms) are preferable in terms of enhancing the toughness and impact resistance.

The content of the elastomer, which varies depending on the type or application and therefore cannot be defined sweepingly, is for example, preferably in a range of 1 to 300 parts by mass, more preferably in a range of 3 to 100 parts by mass, and still more preferably in a range of 5 to 45 parts by mass based on 100 parts by mass of the polyarylene sulfide resin. The content of the elastomer being within such a range can result in an even more excellent effect in terms of ensuring the heat resistance and toughness of a molding.

The cross-linkable resin to be formulated in the polyarylene sulfide resin composition has two or more cross-linkable functional groups. Examples of the cross-linkable functional group include an epoxy group, a phenolic hydroxyl group, an amino group, an amide group, a carboxy group, an acid anhydride group and an isocyanate group. Examples of the cross-linkable resin include epoxy resins, phenol resins and urethane resins.

As the epoxy resin, aromatic epoxy resins are preferable. The aromatic epoxy resin may have a halogen group, a hydroxyl group or the like. Examples of a suitable aromatic epoxy resin include a bisphenol A type epoxy resin, a bisphenol F type epoxy resin, a bisphenol S type epoxy resin, a biphenyl type epoxy resin, a tetramethylbiphenyl type epoxy resin, a phenol novolac type epoxy resin, a cresol novolac type epoxy resin, a bisphenol A novolac type epoxy resin, a triphenylmethane type epoxy resin, a tetraphenylethane type epoxy resin, a dicyclopentadiene-phenol addition reaction type epoxy resin, a phenol aralkyl type epoxy resin, a naphthol novolac type epoxy resin, a naphthol aralkyl type epoxy resin, a naphthol-phenol-cocondensed novolac type epoxy resin, a naphthol-cresol-cocondensed novolac type epoxy resin, an aromatic hydrocarbon formaldehyde resin-modified phenol resin type epoxy resin and biphenyl novolac type epoxy resin. These aromatic epoxy resins can be used singly or in combinations of two or more thereof. Among these aromatic epoxy resins, a novolac type epoxy resin is preferable, and a cresol novolac type epoxy resin is more preferable in terms of an excellent compatibility with other resin components in particular.

The content of the cross-linkable resin is preferably in a range of 1 to 300 parts by mass, more preferably 3 to 100 parts by mass, and still more preferably 5 to 30 parts by mass based on 100 parts by mass of the polyarylene sulfide resin. The content of the cross-linkable resin being within such a range can result in a much more significant effect of enhancing the stiffness and heat resistance of a molding.

The polyarylene sulfide resin composition can contain a silane compound having a functional group. Examples of the silane compound include silane coupling agents such as γ-glycidoxypropyltrimethoxysilane, γ-glycidoxypropyltriethoxysilane, β-(3,4-epoxycyclohexyl)ethyltrimethoxysilane, γ-glycidoxypropylmethyldiethoxysilane and γ-glycidoxypropylmethyl dimethoxysilane.

The content of the silane compound is, for example, in a range of 0.01 to 10 parts by mass, and preferably in a range of 0.1 to 5 parts by mass based on 100 parts by mass of the polyarylene sulfide resin. The content of the silane compound being within such a range can result in an effect of enhancing the compatibility of the polyarylene sulfide resin with other components.

The polyarylene sulfide resin composition may contain a release agent, a colorant, a thermal stabilizer, an ultraviolet stabilizer, a foaming agent, a rust inhibitor, a flame retardant and a lubricant, and an additive other than them. The content of the additive is, for example, in a range of 1 to 10 parts by mass based on 100 parts by mass of the polyarylene sulfide resin.

The polyarylene sulfide resin composition can be obtained in a form of a pelletized compound or the like by a method in which the polyarylene sulfide resin (a reaction product of melt polymerization) and other components are melt-kneaded. The temperature in melt-kneading is, for example, in a range of 250 to 350° C. The duration in melt-kneading is, for example, 5 to 30 seconds. Melt-kneading can be carried out by using a twin-screw extruder or the like.

The polyarylene sulfide resin composition can be processed, alone or in combination with other materials, into a molding excellent in heat resistance, molding processability, dimensional stability or the like by various melt processing methods such as injection molding, extrusion molding, compression molding and blow molding. The polyarylene sulfide resin obtained by using the manufacturing method according to the present embodiment or a resin composition containing it, which enables to sufficiently reduce the amount of a remaining dealkylating agent or dearylating agent, the oligomer component of the polyarylene sulfide resin or the like, enables to manufacture a high-quality molding easily because the generation of a gas in heating is small.

The polyarylene sulfide resin obtained by the manufacturing method according to the present invention or a resin composition containing the resin possesses various performances such as heat resistance and dimensional stability, which the polyarylene sulfide resin has by nature, and are therefore widely useful for materials for various molding such as injection molding or compression molding for electric/electronic parts such as a connector, a printed substrate and a sealed molding, automotive parts such as a lamp reflector and various electrical component parts, interior decoration materials for various buildings, an airplane, an automobile and the like or precision parts such OA equipment parts, camera parts and clock parts, extrusion molding for a composite, a sheet, a pipe or the like, or pultrusion molding; or materials for a fiber or a film, for example.

EXAMPLES

Hereinafter, the present invention will be described more specifically through exemplifying Examples. However the present invention is never limited to these Examples.

In Examples shown hereinafter, the following reagents were used.

methylphenyl sulfoxide: manufactured by Tokyo Chemical Industry Co., Ltd., purity 98% thioanisole: manufactured by Wako Pure Chemical Industries, Ltd., purity 99% methanesulfonic acid: manufactured by Wako Pure Chemical Industries, Ltd., Wako special grade 60% perchloric acid: manufactured by Wako Pure Chemical Industries, Ltd., Wako 1st grade pyridine: manufactured by Wako Pure Chemical Industries, Ltd., JIS special grade potassium hydrogen carbonate: manufactured by Wako Pure Chemical Industries, Ltd., JIS special grade bromine: manufactured by Wako Pure Chemical Industries, Ltd., JIS special grade trifluoromethanesulfonic acid: manufactured by Wako Pure Chemical Industries, Ltd., Wako special grade quinoline: manufactured by Wako Pure Chemical Industries, Ltd., JIS special grade 1. Evaluation Method 1-1. Identification Method ($^1$H-NMR, $^{13}$C-NMR)

Measurements were performed with a DPX-400 instrument manufactured by Bruker Corporation after dissolving in various deuterated solvents.

1-2. Glass Transition Temperature and Melting Point

Measurements were performed to 40 to 350° C. under a nitrogen flow of 50 mL/min under temperature elevation conditions of 20° C./min to determine respective glass transition temperatures and melting points with the DSC instrument Pyris Diamond manufactured by PerkinElmer Co., Ltd.

1-3. Amount of Dealkylating Agent or Dearylating Agent Remaining in Resin

The amount of a dealkylating agent or dearylating agent remaining in a polyarylene sulfide resin was measured with a GCMS-QP2010 manufactured by Shimadzu Corporation.

2. Synthesis of Monomer (Synthesis of methylphenyl[4-(methylthio)phenyl]sulfonium perchlorate)

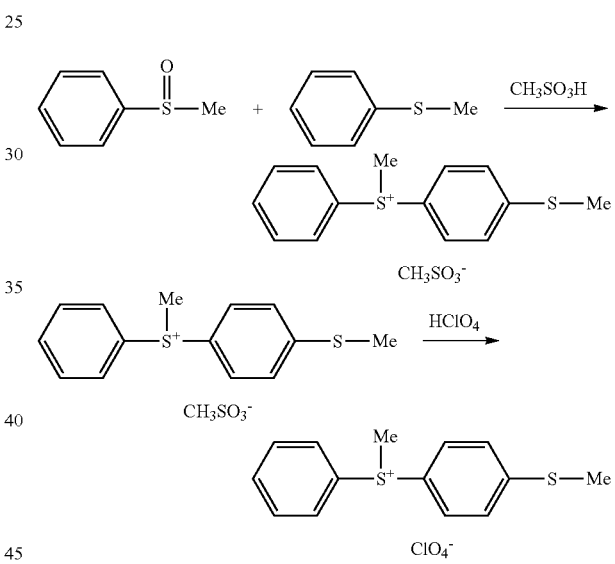

In a 3 L three-necked flask were placed 70.0 [g] of methylphenyl sulfoxide and 62.0 [g] of thioanisole, and cooled to 5° C. or less in an ice bath under a nitrogen atmosphere. While keeping the temperature at 10° C. or less, 1 [L] of methanesulfonic acid was added to the reaction solution. Thereafter, the ice bath was removed followed by raising the temperature to a room temperature and stirring for 20 hours. Subsequently, the reaction solution after stirring was placed into 2 [L] of a 60% aqueous solution of perchloric acid and stirred for 1 hour. After adding 1 [L] of water and 1 [L] of dichloromethane, the organic layer was recovered by an extraction/separation process. Additionally, 500 [mL] of dichloromethane was added to the aqueous layer and a process to recover the organic layer was carried out twice. To the recovered organic layer was added anhydrous magnesium sulfate for dehydration. After the dehydration, the magnesium sulfate was filtered out by filtration and the filtrate was concentrated with a rotary evaporator to remove the solvent. To the residual viscous solid was added an ether to crystallize. The crystalline product was filtered out by filtration, and the obtained solid was dried under a reduced pressure for 20 hours to afford 130.0 [g] (yield 75%)

of methylphenyl[4-(methylthio)phenyl]sulfonium perchlorate. As a result of $^1$H-NMR measurement, it was confirmed that the target product was synthesized. $^1$H-NMR (solvent: CDCl$_3$): 2.49, 3.63, 7.40, 7.65, 7.78, 7.85

(Synthesis of methyl-4-(phenylthio)phenyl sulfide)

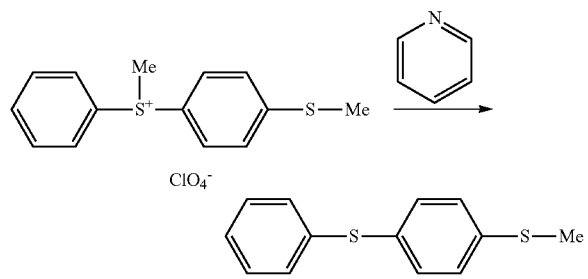

In a 2 L three-necked flask was placed 100.0 [g] of methylphenyl[4-(methylthio)phenyl]sulfonium perchlorate, and 500 [mL] of pyridine was added under a nitrogen atmosphere followed by stirring for 30 minutes. Thereafter, the temperature was raised to 100 [° C.] followed by stirring for 30 minutes. The reaction solution was placed into 3 [L] of 10% HCl solution and stirred for 10 minutes, and the organic layer was recovered by an extraction/separation process with dichloromethane. To the recovered organic layer was added anhydrous magnesium sulfate for dehydration. The magnesium sulfate was filtered out by filtration and the filtrate was concentrated with a rotary evaporator to remove the solvent. The target component was recovered by using column chromatography with hexane/chloroform=3/1 (volume ratio) as the developing solvent, and the solvent was removed with a rotary evaporator. The obtained liquid was dried under a reduced pressure for 20 hours to afford 55.5 [g] (yield 83%) of methyl-4-(phenylthio)phenyl sulfide. As a result of $^1$H-NMR measurement, it was confirmed that the target product was synthesized.

$^1$H-NMR (solvent: CDCl$_3$): 2.48, 7.18-7.23, 7.28-7.31 [ppm]

(Synthesis of methyl-4-(phenylthio)phenyl sulfoxide)

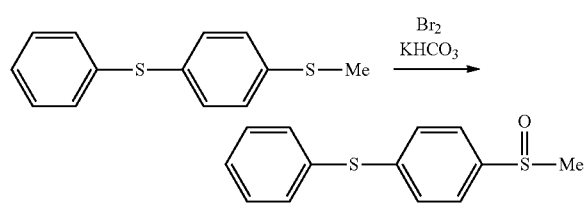

In a 5 L three-necked flask were placed 50.0 [g] of methyl-4-(phenylthio)phenyl sulfide, 43.0 [g] of potassium hydrogen carbonate, 390 [mL] of water and 500 [mL] of dichloromethane, and stirred for 30 minutes. A solution in which 34.5 [g] of bromine had been dissolved in 500 [mL] of dichloromethane was added dropwise into the reaction vessel over 5 minutes followed by stirring for 30 minutes. Into the reaction solution were placed 1 [L] of a saturated potassium chloride (KCl) solution and 1 [L] of dichloromethane and the organic layer was recovered by an extraction/separation process. To the residual aqueous layer was added 500 [mL] of dichloromethane and a process to recover the organic layer was carried out twice. The recovered organic layer was washed with water, and the organic layer was recovered by a separation process, to which anhydrous magnesium sulfate was added for dehydration. After the dehydration, the magnesium sulfate was filtered out by filtration and the filtrate was concentrated with a rotary evaporator to remove the solvent. To the residual viscous solid was added an ether to crystallize. The crystalline product was filtered out by filtration, and the obtained solid was dried under a reduced pressure for 20 hours to afford 30.5 [g] (yield 57%) of methyl-4-(phenylthio)phenyl sulfoxide. As a result of $^1$H-NMR and $^{13}$C-NMR measurements, it was confirmed that the target product was synthesized.

$^1$H-NMR (solvent: CDCl$_3$): 2.71, 7.34, 7.39, 7.46, 7.52 [ppm]
$^{13}$C-NMR (solvent: CDCl$_3$): 46.0, 124.5, 128.5, 129.7, 133.0, 133.5, 141.5, 144.3 [ppm]

3. Synthesis of poly(arylenesulfonium salt)

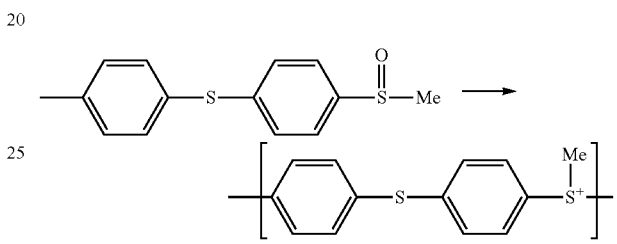

Synthesis Example 1

In a 500 mL three-necked flask was placed 2.0 [g] of methyl-4-(phenylthio)phenyl sulfoxide and cooled in an ice bath under a nitrogen atmosphere. Thereafter, 10 [mL] of trifluoromethanesulfonic acid was slowly added dropwise. The temperature was raised to a room temperature followed by stirring for 20 hours. Water was poured into the reaction solution after stirring, which was stirred for 10 minutes and then filtered. Thereafter, the resultant was washed with water and filtrated to recover the solid. The solvent was removed with a rotary evaporator and the resultant was dried under a reduced pressure to afford 2.8 [g] (yield 91%) of the target product poly[methyl trifluoromethanesulfonate(4-phenylthiophenyl)sulfonium].

A small amount of the obtained target product was collected for analysis, and after being ion-exchanged with an excessive amount of methanesulfonic acid, dissolved in deuterated DMSO, which was subjected to $^1$H-NMR measurement and as a result it was confirmed that the target product was synthesized.

$^1$H-NMR (deuterated DMSO): 3.27, 3.83, 7.66, 8.08 [ppm]

Synthesis Example 2

To a 3 L three-necked flask were added 5.0 [g] of poly[methyl trifluoromethanesulfonate(4-phenylthiophenyl)sulfonium] and 500 [mL] of methanesulfonic acid, stirred at room temperature for 24 hours and ion-exchanged. Thereafter, the resultant was filtered, and the residue after filtration was washed with water and dried in vacuum to afford 3.9 [g] (yield 90%) of poly[methyl methanesulfonate (4-phenylthiophenyl)sulfonium]. It was confirmed that fluorine was not detected by a scanning electron microscope/energy dispersive X-ray spectrometer (SEM-EDS).

A small amount of the obtained target product was collected for analysis, and dissolved in deuterated DMSO, which was subjected to $^1$H-NMR measurement and as a result it was confirmed that the target product was synthesized.

$^1$H-NMR (deuterated DMSO): 3.27, 3.93, 7.76, 8.19 [ppm]

4. Synthesis of Polyarylene Sulfide Resin (Dealkylation or Dearylation of Poly(Arylenesulfonium Salt))

Example 1

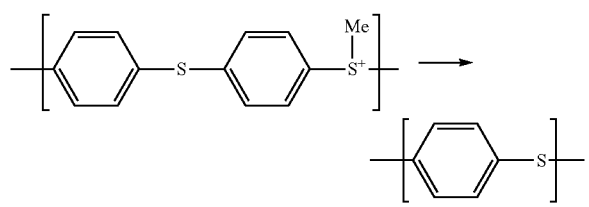

In a 100 mL eggplant flask was placed 2.0 [g] of poly[methyl trifluoromethanesulfonate(4-phenylthiophenyl)sulfonium]obtained in Synthesis Example 1, and 80 [mL] (157 equivalents) of N-methyl-2-pyrrolidone was added as a dealkylating agent or dearylating agent, which was stirred at room temperature for 30 minutes followed by raising the temperature to 100° C. and stirring for 48 hours. The reaction solution after stirring was cooled to a room temperature and then placed into water, and the precipitate was filtered out by filtration and washed with 80 [mL] of water three times. The obtained solid was dried under a reduced pressure to afford 1.0 [g] (yield 90%) of polyphenylene sulfide. The obtained solid was subjected to a thermal analysis and as a result the glass transition temperature (Tg) was 92° C. and the melting point was 278° C., from which it was confirmed that a polyphenylene sulfide resin (PPS resin) was produced. The amount of remaining N-methyl-2-pyrrolidone of the obtained PPS resin was checked by using GC-MS, and as a result it was confirmed to be 80 [ppm].

Example 2

In the same way as in Example 1 except that the dealkylating agent or dearylating agent was changed to 5.5 [mL] (10 equivalents) of N-methyl-2-pyrrolidone, 0.83 [g] (yield 73%) of a polyphenylene sulfide was obtained. The obtained solid was subjected to a thermal analysis and as a result the glass transition temperature (Tg) was 92° C. and the melting point was 278° C., from which it was confirmed that a PPS resin was produced. The amount of remaining N-methyl-2-pyrrolidone of the obtained PPS resin was checked by using GC-MS, and as a result it was confirmed to be 10 [ppm] or less.

Example 3

In the same way as in Example 1 except that the dealkylating agent or dearylating agent was changed to 0.8 [mL] (1.5 equivalents) of N-methyl-2-pyrrolidone and 5 [mL] of toluene was further added as a solvent, 0.91 [g] (yield 80%) of a polyphenylene sulfide was obtained. The obtained solid was subjected to a thermal analysis and as a result the glass transition temperature (Tg) was 92° C. and the melting point was 278° C., from which it was confirmed that a PPS resin was produced. The amount of remaining N-methyl-2-pyrrolidone of the obtained PPS resin was checked by using GC-MS, and as a result it was confirmed to be 10 [ppm] or less.

Example 4

In the same way as in Example 1 except that 1.7 [g] of poly[methyl methanesulfonate(4-phenylthiophenyl)sulfonium]obtained in Synthesis Example 2 was used in place of poly[methyl trifluoromethanesulfonate(4-phenylthiophenyl)sulfonium], 0.88 [g](yield 78%) of a polyphenylene sulfide was obtained. The obtained solid was subjected to a thermal analysis and as a result the glass transition temperature (Tg) was 89° C. and the melting point was 275° C., from which it was confirmed that a PPS resin was produced. The amount of remaining N-methyl-2-pyrrolidone of the obtained PPS resin was checked by using GC-MS, and as a result it was confirmed to be 10 [ppm] or less.

Comparative Example 1

In the same way as in Example except that the dealkylating agent or dearylating agent was changed to 66 [mL] (157 equivalents) of pyridine, 0.93 [g] (yield 82%) of a polyphenylene sulfide was obtained. The obtained solid was subjected to a thermal analysis and as a result the glass transition temperature (Tg) was 88° C. and the melting point was 273° C., from which it was confirmed that a PPS resin was produced. The amount of remaining pyridine of the obtained PPS resin was checked by using GC-MS, and as a result it was confirmed to be 3600 [ppm].

Comparative Example 2

In the same way as in Example except that the dealkylating agent or dearylating agent was changed to 98 [mL] (157 equivalents) of quinoline, 1.02 [g] (yield 90%) of a polyphenylene sulfide was obtained. The obtained solid was subjected to a thermal analysis and as a result the glass transition temperature (Tg) was 85° C. and the melting point was 270° C., from which it was confirmed that a PPS resin was produced. The amount of remaining quinoline of the obtained PPS resin was checked by using GC-MS, and as a result it was confirmed to be 10000 [ppm] or more.

TABLE 1

| | | Example | | | | Comparative Example | |
|---|---|---|---|---|---|---|---|
| | | 1 | 2 | 3 | 4 | 1 | 2 |
| Poly(arylenesulfonium salt) | | Synthesis Example 1 | Synthesis Example 1 | Synthesis Example 1 | Synthesis Example 2 | Synthesis Example 1 | Synthesis Example 1 |
| Dealkylating agent or dearylating agent [eq.] | NMP | 157 | 10 | 1.5 | 157 | — | — |
| | Pyridine | — | — | — | — | 157 | — |
| | Quinoline | — | — | — | — | — | 157 |

TABLE 1-continued

|  | Example | | | | Comparative Example | |
| --- | --- | --- | --- | --- | --- | --- |
|  | 1 | 2 | 3 | 4 | 1 | 2 |
| Amount of remaining dealkylating agent or dearylating agent [ppm] | 80 | <10 | <10 | <10 | 3600 | 10000< |

As is clear from the result shown in Table 1, it was confirmed that the amount of a remaining dealkylating agent or dearylating agent in the polyarylene sulfide resin synthesized by the method in Examples 1 to 4 was significantly reduced compared with the polyarylene sulfide resin synthesized by using the method in Comparative Examples 1, 2.

The invention claimed is:

1. A method for manufacturing a polyarylene sulfide resin comprising:

reacting a poly(arylenesulfonium salt) having a constitutional unit represented by the following formula (1) with an aliphatic amide compound to obtain a polyarylene sulfide resin having a constitutional unit represented by the following formula (2):

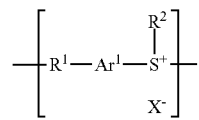

(1)

wherein
$R^1$ represents a direct bond, $-Ar^2-$, $-Ar^2-S-$ or $-Ar^2-O-$;
$Ar^1$ and $Ar^2$ each represent an arylene group optionally having a functional group as a substituent;
$R^2$ represents an alkyl group having 1 to 10 carbon atoms or an aryl group optionally having an alkyl group having 1 to 10 carbon atoms; and
$X^-$ represents an anion,

(2)

wherein
$R^1$ represents a direct bond, $-Ar^2-$, $-Ar^2-S-$ or $-Ar^2-O-$; and
$Ar^1$ and $Ar^2$ each represent an arylene group optionally having a functional group as a substituent.

2. The method for manufacturing a polyarylene sulfide resin according to claim 1, wherein the aliphatic amide compound comprises an aliphatic tertiary amide compound.

* * * * *